United States Patent
Weigand

[11] 3,859,437
[45] Jan. 7, 1975

[54] REDUCING CHOLESTEROL LEVELS
[75] Inventor: Alan Hugh Weigand, Fort Lee, N.J.
[73] Assignee: Intellectual Property Development Corporation, New Rochelle, N.Y.
[22] Filed: Apr. 2, 1973
[21] Appl. No.: 346,751

Related U.S. Application Data
[63] Continuation-in-part of Ser. No. 259,062, June 2, 1972, abandoned, which is a continuation-in-part of Ser. No. 126,296, March 19, 1971, abandoned.

[52] U.S. Cl................................ 424/238, 424/242
[51] Int. Cl............................................ A61k 27/00
[58] Field of Search............................ 424/238, 242

[56] References Cited
OTHER PUBLICATIONS
Howe et al., J. Nutrition, Vol. 72, p. 379–386, 1960.

*Primary Examiner*—Richard L. Huff

[57] ABSTRACT

A method for reducing the levels of cholesterol and other lipids in mammals, which comprises administering to said mammals an effective amount of a substance having the formula

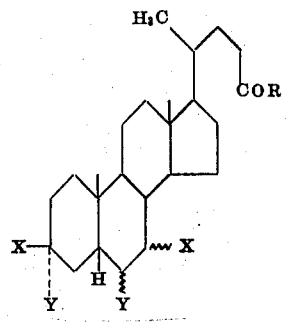

wherein R is selected from the group consisting of OH; $NHCH_2COOH$, and $NHCH_2CH_2SO_3H$; each X is hydrogen, each Y is hydroxy or acyloxy, and when taken together X and Y is oxo (O=); and the nontoxic pharmaceutically acceptable salts thereof.

19 Claims, No Drawings

REDUCING CHOLESTEROL LEVELS

This application is a continuation-in-part application of my previously filed, pending application, Ser. No. 259062, filed June 2, 1972 now abandoned, which is a continuation-in-part application of previously filed application, Ser. No. 126,296, filed Mar. 19, 1971 now abandoned.

This invention relates to and has as its objective a method of reducing the levels of cholesterol and other lipids, especially triglycerides, in mammals. Current medical theory holds that there is a causal relationship between elevated cholesterol and lipid levels and the development of artherosclerosis and other adverse conditions in mammals. Artherosclerotic conditions are a major cause of death by virtue of their relation to hardening and narrowing of blood vessel walls and the occurrence of thromboses leading to coronary attacks and strokes.

In addition, it is believed that in many hypercholesteremic conditions over active or excessive cholesterol synthesis may be responsible for the development of the condition. When, in certain cases, excess cholesterol is synthesized and/or otherwise introduced into the system, the body reacts by distributing the excess cholesterol to various body pools where it is deposited and accumulates. Among the body pools wherein this excess cholesterol may be distributed and deposited are included the gall bladder, wherein the deposits take the form of cholesterol stones, and the blood vessels wherein the deposits may be in the form of artheroscelerotic plaque. Thus, the presence of excess levels of cholesterol in the body, to which the body naturally reacts by distribution and deposition thereof to various body pools, results in such adverse conditions as cholesterol gall stones and artherosclerotic plaque.

Presently there are available medically approved substances which are prophyllactically administered to patients for the purpose of reducing cholesterol and lipid blood levels. Such products, for example clofibrate, (commercially available from Ayerst Laboratories under the tradename, "Atromid"), are known cholesterol inhibitors and must be chronically administered in substantial daily doses over extended, and as yet not fully determined periods of time, perhaps years, to achieve their purpose. To date there is no knowledge as to the possible toxic effect the chronic administration of these presently known cholesterol inhibiting agents will have on the patients being treated. In addition, it does not appear that any of the substances hereinbefore administered to lower cholesterol and lipid levels has resulted in the reversal of the mechanism by which excess cholesteremic concentrations are deposited in various body pools, thereby creating the adverse conditions hereinbefore described.

It now appears that the rate limiting step in the synthesis of cholesterol in the body may be the conversion of 3$\beta$-hydroxy-3$\beta$-methyl glutaric acid to mevalonic acid. This reaction seems to be controlled by the activity of a catalytic enzyme, 3$\beta$-hydroxy 3$\beta$-methyl glutaryl CoA reductase. Therefore, by controlling the activity of this enzyme, the synthesis of cholesterol is controlled. By controlling the synthesis of cholesterol in the body, it is possible to reverse the mechanism whereby the body distributes and causes the deposit of excess cholesterol in various body pools, such as the gall bladder and blood vessels. Inhibiting or suppressing synthesis cholesterol, causes the body to deplete or withdraw from the various body pools, wherein excess cholesterol was previously deposited, the excess cholesterol therein deposited. Therefore, the suppression of cholesterol synthesis will result in the overall reduction of cholesterol and other lipid levels in the body. In fact, the suppression of the synthesis of cholesterol will result in a reversal of the mechanism by which excess cholesterol was previously deposited in the various body pools and therefore will result in a lowering of the cholesterol and lipid levels in mammals. More particularly, by suppression of cholesterol synthesis with a concommitant reversal of the mechanism of excess cholesterol deposition in various body pools, there results a reversal of such conditions as cholesterol gall stones, i.e., reduction and/or dissolution of the stones, and artherosclerotic plaque formation in blood vessels.

There has now been discovered a method whereby the cholesterol and lipid levels in mammals may be satisfactorily and safely reduced. More particularly, I have discovered a method to reduce the cholesterol and lipid, including triglyceride, levels of mammals which comprises administering to said mammals an effective amount of a composition selelcted from the group consisting of those of the formula:

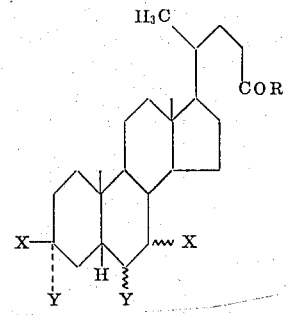

wherein R is selected from the group consisting of OH, NHCH$_2$ COOH and NHCH$_2$CH$_2$SO$_3$H; each X is hydrogen; each Y is selected from the group consisting of hydroxy and acyloxy; and when taken together, X and Y is oxo (O=).

In addition, the compounds of this invention may be administered in the form of their non-toxic pharmaceutically acceptable salts, for example, the alkaline metal salts, such as the sodium or potassium salts thereof.

More particularly, it has been found that administration of the compounds of Formula I of this invention to hypercholesteremic mammals results in the inhibition of activity of the rate limiting enzyme which controls the rate of cholesterol synthesis in mammals, and thus results in a lowering of the cholesterol and other lipid levels of the hypercholesteremic mammal being treated. In fact, the inhibition of cholesterol synthesis by the practice of this invention results in a decrease of the natural distribution of cholesterol into the plasma and bile of the mammal being treated, and consequently will lead to a reversal of the process whereby excessive cholesterol has been previously deposited resulting in the formation of cholesterol gall stones and artherosclerotic plaque. Thus, administration of the compounds of Formula I, in the practice of this invention, to hypercholesteremic mammals, will apparently lead to a depletion of excessive cholesterol deposits in the body of said mammal, for example, cholesterol gallstones and artherosclerotic plaque.

In addition to the foregoing, it is now known that substantial amounts of cholesterol synthesized by the liver are converted by the body to desireable bile acids. The rate at which this conversion takes place is controlled by another enzyme, cholesterol-7α-hydroxylase. It has now been discovered that while certain bile acids, notably cholic acid, i.e. 3α, 7α, 12α-trihydroxy-5β-cholanic acid and deoxycholic acid, i.e. 3α, 12α-dihydroxy-5β-cholanic acid, have an adverse effect on the activity of this enzyme, the compounds of this invention have no adverse effect, and in some instances have apparently had an elevating effect on the cholesterol 7α-hydroxylase enzyme. Thus, it has also been found that the compounds of this invention reduce cholesterol by not interfering with and in some instances augmenting the bodys natural process of converting undesired cholesterol into desired bile acids. In addition to the foregoing, reference may be had to my pending prior filed application Ser. No. 304295, filed Nov. 13, 1972, wherein it is shown that the cholesterol 7α-hydroxylase enzyme which controls the conversion of synthesized cholesterol into bile acids, is not adversely affected by the compounds of this invention.

The preferred acyloxy radicals are those of hydrocarbon carboxylic acids of less than twelve carbon atoms, as exemplified by the lower alkanoic acids (e.g., acetic, propionic, and butyric acids), the lower alkenoic acids, the monocyclic aryl carboxylic acids (e.g., benzoic and toluic acids), the monocyclic aryl lower alkanoic acids (e.g. phenacetic and-B-phenylpropionic acids), the cycloalkane carboxylic acids and the cycloalkene carboxylic acids.

In this Specification and in the Claims appended hereto, whenever in the structural formulae set forth therein the linkage of atoms is represented by a curved line $\gtreqless$ it is meant to denote that the connected moiety may be in the α-or β-position as the case may be.

In the practice of the instant invention the preferred embodiment thereof is where R is —OH. Thus, in its preferred embodiment, this invention contemplates the employment of such compounds as 3α,7α-dihydroxy-5β-cholanic acid; 3α,7α-diacyloxy-5β-cholanic acid; 3, 7 -dioxo-5β-cholanic acid; 3α, 7β-dihydroxy 5β-cholanic acid; 3α,7β-diacyloxy-5β-cholanic acid, 3α-hydroxy-7β-acetoxy-5β-cholanic acid; 3α-hydroxy-7α-acyloxy-5β-cholanic acid, for example, 3α-hydroxy-7α-acetoxy-5β-cholanic acid, and other like compounds. These compounds are well known in the art or easily derived from known compounds by chemical processes well known to those skilled in the art. In the most preferred embodiment of this invention, 3α,7α-dihydroxy-5β-cholanic acid is the compound utilized for the most satisfactory results.

Further satisfactory embodiments of the instant invention involve those compounds of Formula I wherein R is —NHCH$_2$COOH or —NHCH$_2$CH$_2$SO$_3$H. These materials are obtained by the conjugation of the respective free acids of Formula I, (i.e. wherein R is —OH), with the respective amino acids, i.e. glycine or taurine, by standard reactions which are well known to the art.

The compositions of this invention may be administered to the patients being treated in accordance with the method of this invention. It has been found that satisfactory results are obtained when the compositions of this invention are orally administered to the patient in a daily amount of from about 50 milligrams to about 1.5 grams. Best results appear to be obtained when the initial dosage is in the range of from about 0.5–1.5 gm. per day and then gradually reduced and maintained at a level of about 100 mg. per day depending upon the patient being treated and the results obtained.

In the practice of this invention, it has been found that most satisfactory results are obtained when up to about 750 mg. per day are administered to the hypercholesteremic patient being treated, the optimum daily dosage appearing to be about 500 to 750 mg. per day, although other dosage levels have been found to give beneficial results also. It has been found that the daily administration of more than 1.5 grams of the respective active substance of this invention imparts no additional beneficial effect to the patient beyond that achieved with a lesser daily dosage level.

To achieve the purpose and objectives of this invention, the active substances of Formula I hereof may be incorporated in such suitable final dosage forms as may be satisfactorily prepared and employed by the worker skilled in the art. Thus, the commonly employed, pharmaceutically acceptable dosage forms suitable for oral administration containing the active substance of Formula I in sufficient concentration to attain the desired results may be utilized. The pharmaceutically acceptable, non-toxic inert carriers usually employed for such purposes may be utilized to prepare such dosage forms as tablets, capsules, elixirs, solutions, suspensions and the like. Most preferably, satisfactory results have been obtained by the use of tablets or capsules containing the active ingredient in a concentration of from about 50 to about 500 mg., although other concentrations have also provided satisfactory results.

The invention may be further illustrated by the following Examples.

EXAMPLE I

Final orally administerable dosage forms incorporating the amounts of active substances set forth in Table A were prepared and administered on a daily basis to patients having abnormally elevated lipid, for example cholesterol and triglyceride, levels. These materials were administered to the patients over an extended period of time during which there was a substantial reduction in the lipid, i.e., cholesterol and triglyceride, levels of the patients, to within normal ranges.

TABLE A

| Material | Amount |
| --- | --- |
| 3α,7α-dihydroxy-5β-cholanic acid | 250 mg. |
| 12-desoxy-cholytaurine | 250 mg. |
| 3α,7α,-diacetoxy-5β-cholanic acid | 250 mg. |
| 12-desoxy-cholylglycine | 250 mg. |
| 3,7-dioxy-5β-cholanic acid | 250 mg. |
| 3α,7β-dihydroxy-5β-cholanic acid | 250 mg. |

EXAMPLE II

Male Wistar rats were kept in individual cages and received a stock diet of ground Purina rat chow plus 5% corn oil. Bile acids, i.e., sodium taurocholate, sodium taurochenodeoxycholate and sodium taurodeoxycholate, were added to the stock diets at a level of 1%. The experimental diets were fed for one week after which the bile ducts of the test animals were cannulated and their bile collected for a period of 30 to 60 minutes. At the end of the bile collection period, the test animals were sacrificed, their livers removed and a microsomal fraction was prepared by ultracentrifugation. Assays of HMG-CoA reductase and cholesterol 7α-hydroxylase were carried out in accordance with the procedures described in 13 J. Lipid Research 402–412 (1972) and 9 J. Lipid Research 328–333 (1968), respectively. Liver cholesterol concentrations were measured by GLC.

The following table shows the results obtained:

| Test Compound | No. Animals | Enzyme Activity** HMG | C-7H | Liver Cholesterol*** Concentration |
|---|---|---|---|---|
| Stock Diet (SD) | 6 | 93.9 | 9.11 | 2.45 |
| SD+1%TCDC | 6 | 35.1 | 8.49 | 2.57 |
| SD+1%TDC | 4 | 63.8 | 7.22 | 3.78 |
| SD+1%TC | 6 | 36.6 | 3.08 | 6.09 |

*TCDC = taurochenodeoxycholic acid
TDC = taurodeoxycholic acid
TC = taurocholic acid
**HMG = HMG CoA reductase
C-7H = cholesterol 7α-hydroxylase
Activity is given in pmoles/mg protein/min.
***mg/g (wet wt.)

That these tests show that chenodeoxycholic acid (TCDC) significantly lowers the synthesis rate of cholesterol in the test animals by control of the enzyme, HMG-CoA reductase, without adversely effecting the rate of conversion of cholesterol to bile acids or adversely effecting the concentration of cholesterol in the liver.

EXAMPLE III

M.T., a 53 year ole male suffering from Type V hyperlipidemia, i.e. elevated triglyceride and cholesterol levels, was observed for an eight day control period during which control values of his lipid levels were determined. The average control lipid values were:

Cholesterol: 250±7 mg/100 ml.
Triglycerides: 2021 ± 326 mg/100 ml.

Over a period of ten days, 3α,7α-dihydroxy-5β-cholanic acid was orally administered to the patient. The daily dosage level of 3α,7α-dihydroxy-5β-cholanic acid was 750 mg., administered three times per day in capsule form, each containing 250 mg. of the compound. At the end of the ten day period the lipid values of the patient were found to be:

Cholesterol: 190 ± 18 mg/100 ml.
Triglycerides: 1484 ± 308 mg/100 ml.

No adverse reactions were experienced by the patient during or after this test.

EXAMPLE IV

Patients with elevated cholesterol levels were tested to determine the effect of the compound, 3α,7α-dihydroxy-5β-cholanic acid in lowering the level of cholesterol. The patients were studied to determine their control cholesterol values and then were treated with the test compound which was orally administered. The results are reported in Table B below:

TABLE B

| Patient | Dosage | Control | Cholesterol Values After | | |
|---|---|---|---|---|---|
| | | | 1 Mo. | 3 Mo. | 4 Mo. | 6 Mo. |
| N.C. | 750 mg/day | 262 | 246 | 207 | — | — |
| R.R. | do. | 271 | — | — | 173 | — |
| C.F. | do. | 305 | — | — | 266 | — |
| K.S. | do. | 230 | — | — | 107 | — |
| G.W. | do. | 450 | — | — | — | 358 |

There were no adverse reactions experienced during or after these tests by any of the patients.

EXAMPLE V

Two patients with elevated cholesterol level and cholelithiasis were treated with a compound of the instant invention to determine its effect in lowering the cholesterol level of the patients.

The results are reported in Table C below:

TABLE C

| Patient | Test Compound | Control | Cholesterol Values After | | |
|---|---|---|---|---|---|
| | | | 3 Mo. | 7 Mo. | 12 Mo. |
| E.Y. | 3α,7α-dihydroxy-5β-cholanic acid | 243 | 258 | — | 244 |
| T.S. | do. | 279 | — | 235 | — |

After 12 months of administration of the compound of this invention, the patient E. Y. experienced a 70% reduction in the size of the cholesterol stones in the gall bladder (confirmed by radiological studies), without a concomitant rise in the patient's overall cholesterol level.

After 7 months of administration of the compound of this invention, the patient T. S., experienced total and complete disappearance of the stones in the gallbladder (confirmed by radiological studies), with a concurrent reduction in cholesterol levels in excess of 15%.

These tests evidence that the compounds of this invention reduce the overall cholesterol levels in the body of the patient being treated.

The invention may be variously otherwise embodied within the scope of the appended claims.

What is claimed is:

1. The method of reducing lipid levels of human beings, which comprises;
   a. orally administering over an extended period of time, to a human being in a hyperlipidemic state;
   b. a small but effective amount sufficient to effect a reduction of the lipid levels of said human being, of a compound of the formula:

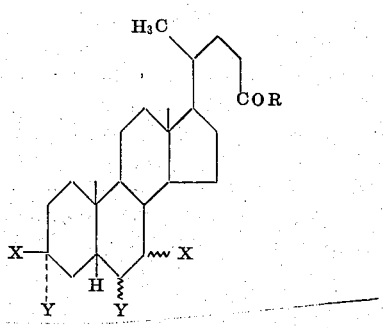

wherein
R is OH, NHCH$_2$COOH, or NHCH$_2$CH$_2$SO$_3$H;
each X is hydrogen;
each Y is hydroxy, or acyloxy; and X and Y when taken together is oxo (O=);
and the non-toxic, pharmaceutically acceptable salts thereof.

2. The method of claim 1, wherein the compound is 3α,7α-dihydroxy-5β-cholanic acid.

3. The method of claim 1, wherein the compound is administered in a daily dosage amount of about 750 mg. per day.

4. The method of claim 1, wherein in the compound each Y is hydroxy.

5. The method of claim 1, wherein the compound is 3α,7β-dihydroxy-5β-cholanic acid.

6. The method of reducing the cholesterol levels of human beings, which comprises;
   a. orally administering over an extended period of time, to a human being in a hypercholesteremic state;
   b. a small but effective amount sufficient to effect a reduction in the cholesterol level of said human being, of a compound of the formula:

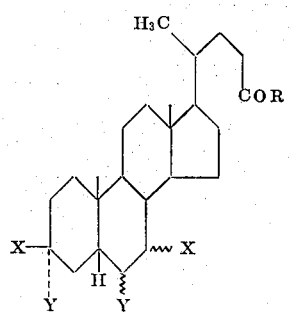

wherein
R is OH, NHCH$_2$COOH, or NHCH$_2$CH$_2$SO$_3$H;
each X is hydrogen;
each Y is hydroxy or acyloxy; and X and Y when taken together is oxo (O=);
and the non-toxic, pharmaceutically acceptable salts thereof.

7. The method of claim 6, wherein the compound is 3α,7α-dihydroxy-5β-cholanic acid.

8. The method of claim 6 wherein the compound is administered in a daily dosage amount of 750 mg. per day.

9. The method of claim 5, wherein the hypercholesteremic state of the human being is hypercholesterolemia.

10. The method of claim 6, wherein in the compound, each Y is hydroxy.

11. The method of claim 6, wherein the compound is 3α,7β-dihydroxy-5β-cholanic acid.

12. The method of reducing the triglyceride levels of human beings, which comprises;
   a. orally administering over an extended period of time, to a human being in a hypertriglyceridemic state;
   b. a small but effective amount sufficient to effect a reduction of the triglyceride level of said human being, of a compound of the formula:

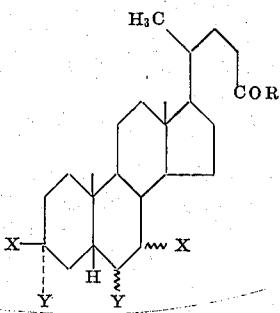

wherein R is OH, NHCH$_2$COOH, or NHCH$_2$CH$_2$SO$_3$H;
each X is hydrogen;
each Y is hydroxy, or acyloxy, and
X and Y when taken together is oxo (O=); and the non-toxic, pharmaceutically acceptable salts thereof.

13. The method of claim 12, wherein the compound is 3α,7α-dihydroxy-5β-cholanic acid.

14. The method of claim 12, wherein the compound is administered in a daily dosage amount of about 750 mg. per day.

15. The method of claim 12, wherein in the compound, each Y is hydroxy.

16. The method of claim 12, wherein the compound is 3α,7β-dihydroxy-5β-cholanic acid.

17. The method of reducing cholesterol levels of human beings, which comprises;
   a. Orally administering over an extended period of time, to a human being suffering from cholelithiasis;
   b. A small but effective amount sufficient to effect a reduction in the cholesterol level of said human being, of a compound of the formula:

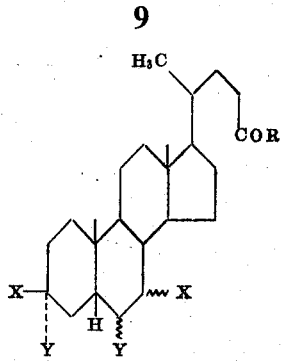
wherein R is OH, NHCH₂COOH or NHCH₂CH₂SO₃H;
each X is hydrogen;
each Y is hydroxy or acyloxy; and
X and Y when taken together is oxo (O=); and the non-toxic pharmaceutically acceptable salts thereof.
18. The method of claim 17, wherein the compound is 3α,7α-dihydroxy-5β-cholanic acid.
19. The method of claim 17, wherein the compound is 3α,7β-dihydroxy-5β-cholanic acid.
* * * * *

UNITED STATES PATENT OFFICE
CERTIFICATE OF CORRECTION

Patent No. 3,859,437    Dated January 7, 1975

Inventor(s) Alan Hugh Weigand

It is certified that error appears in the above-identified patent and that said Letters Patent are hereby corrected as shown below:

In the Abstract and Column 2, line 26, the structural formula, each occurrence, should appear as shown below:

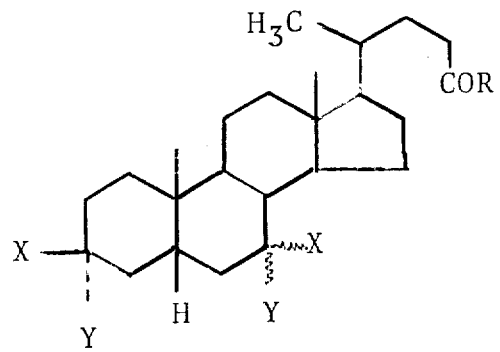

In claims 1, 6, 12 and 17, the structural formula, each occurrence, should appear as below:

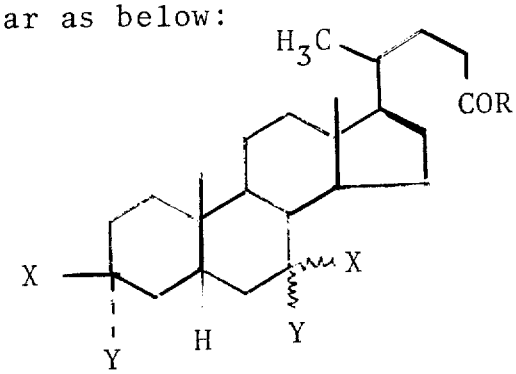

UNITED STATES PATENT OFFICE
CERTIFICATE OF CORRECTION

Patent No. 3,859,437  Dated January 7, 1975

Inventor(s) Alan Hugh Weigand    PAGE - 2

It is certified that error appears in the above-identified patent and that said Letters Patent are hereby corrected as shown below:

In Claim 9, line 1, the term "5" should read -- 6 --.

Signed and Sealed this twenty-third Day of September 1975

[SEAL]

Attest:

RUTH C. MASON
Attesting Officer

C. MARSHALL DANN
Commissioner of Patents and Trademarks